(12) United States Patent
Thomas et al.

(10) Patent No.: US 8,095,328 B2
(45) Date of Patent: *Jan. 10, 2012

(54) SYSTEMS AND METHODS FOR MONITORING MOVING SURFACES

(75) Inventors: John Gordon Thomas, San Diego, CA (US); Peter James Neild, San Diego, CA (US); Raymond Joseph Schumacher, San Diego, CA (US)

(73) Assignee: Cognitive Vision Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/767,904

(22) Filed: Apr. 27, 2010

(65) Prior Publication Data

US 2010/0211343 A1 Aug. 19, 2010

Related U.S. Application Data

(63) Continuation of application No. 11/839,173, filed on Aug. 15, 2007, now Pat. No. 7,734,435.

(60) Provisional application No. 60/822,497, filed on Aug. 15, 2006.

(51) Int. Cl.
  *G06F 11/30* (2006.01)
  *G06F 17/00* (2006.01)
(52) U.S. Cl. ............ 702/70; 702/40; 702/66; 702/74; 73/620

(58) Field of Classification Search .............. 702/70, 702/40, 66, 74
See application file for complete search history.

(56) References Cited

U.S. PATENT DOCUMENTS

| | | | | |
|---|---|---|---|---|
| 5,949,056 A | * | 9/1999 | White | 235/472.01 |
| 6,138,915 A | * | 10/2000 | Danielson et al. | 235/472.02 |
| 7,734,435 B2 | * | 6/2010 | Thomas et al. | 702/70 |
| 2003/0189885 A1 | * | 10/2003 | Masui et al. | 369/47.51 |
| 2004/0179885 A1 | | 9/2004 | Adkins et al. | |
| 2007/0127342 A1 | | 6/2007 | Nobukuni et al. | |
| 2009/0010115 A1 | * | 1/2009 | Fujita et al. | 369/47.5 |

* cited by examiner

*Primary Examiner* — Hal Wachsman
(74) *Attorney, Agent, or Firm* — Reising Ethington P.C.

(57) ABSTRACT

This present specification provides, amongst other things, an electro-optical monitoring system for obtaining a once-per-revolution signal based on the surface reflection of a rotating device that mandates non-contacting sensor input in potentially hostile environments. The system can use optical and electronic sections to illuminate and detect surface reflections from the rotating surface using existing mounting locations on the periphery of the machine to be measured. The electronic portion is configured to determine a unique mark as the once-per-revolution marker or allow an attending operator to assign a specific marker based on the observed reflected pattern. The optical portion consists of a light source, receiver, and optics that allow for focused and directed light paths.

17 Claims, 11 Drawing Sheets

SYSTEMS AND METHODS FOR MONITORING MOVING SURFACES

PRIORITY

This application is a continuation of U.S. patent application Ser. No. 11/839,173 filed on Aug. 15, 2007, now U.S. Pat. No. 7,734,435, which claims priority from U.S. Provisional Patent Application 60/822,497, filed Aug. 15, 2006, the contents of which are incorporated herein by reference.

FIELD

The present specification relates generally to methods and systems for monitoring of vibration, motion and other aspects of moving devices, and more particularly relates to a monitoring system for gas turbine engines and other moving devices.

BACKGROUND

Systems and methods for measurement of vibration and motion of rotational devices are known. For example, many audio spectrum analyzers are available in the marketplace as well as modular approaches using analog-to-digital converter hardware.

The gas turbine engine is one rotational device that can benefit from this technology. Without positional information, many engine faults go unidentified or are identified incorrectly, until failure is imminent. Yet, due to extreme operating conditions, gas turbine engines are among the most difficult type of rotating machinery for engineering a synchronization solution.

The most common positioning solution for gas turbine engines is based on using a fixed reference point positioned on the shaft surface. However, this solution can be intrusive to normal turbine operation and can require shutdown conditions. Maintenance activities are then restricted only to those that can be performed when the unit is down (e.g. during a wash cycle). During shutdown conditions, dynamic testing is accomplished by applying a dab of reflective paint to mark a specific location on the shaft. A once-per-revolution signal is obtained by using a tachometer device connected to a borescope access port. Once the engine is started, however, the paint is reliable for only a short time as it loses its reflective characteristics soon after being subjected to the high temperatures and particulate matter passing through the engine. Use of the paint spot method also presents an operational limitation—the paint must typically be applied at least twenty-four hours prior to any subsequent testing. Typically, this prohibits normal turbine operation for thirty-six hours creating the potential for havoc for normal operations and severe financial losses.

In contrast to shutdown conditions, obtaining a clean once-per-revolution signal from the rotating shaft is the optimum method of gathering data of an operating gas turbine but poses significant engineering challenges. Some of these constraints include: (1) the probe cannot make contact with the shaft, (2) the shaft cannot be modified in any way, (3) nothing must be attached to the shaft, (4) the closest point to the shaft must be several inches away due to rotating compressor blades, (5) the shaft is fully enclosed in a pressurized section of the engine, where the nominal pressure can equal two-hundred pounds-per-square-inch ("PSI"), and (6) the shaft surface temperature can be approximately four-hundred degrees Fahrenheit.

Lacking accurate positional information during operation, many engine faults go unidentified until failure is imminent. While engine-monitoring technologies such as magnetic or radio frequency sensors can detect impending problems (e.g., engine vibration), they require special treatment or changes to the materials used in the machine construction. As a result, the fault remedy is global and not specific. Most often, the expeditious (but costly) remedy is replacement of the entire turbine, versus a time-consuming qualification of fault recognition, and subsequent repair of the causal condition.

SUMMARY

The present specification provides, amongst other things, a fiber-optic tachometer borescope and a focusing tip borescope. The borescope can be used for once-per-revolution phase-dependent turbine inspection and/or positionally aware tangential velocity and/or remote visual inspection.

The present specification provides, amongst other things, systems and methods for obtaining a fixed positional reference point on rotating surfaces.

DETAILED DESCRIPTION OF THE EMBODIMENTS

FIGS. 1-4 show a system for monitoring a moving surface indicated generally at 50, and which comprises an electronic portion 54 and an optical portion 58.

Figure 1:
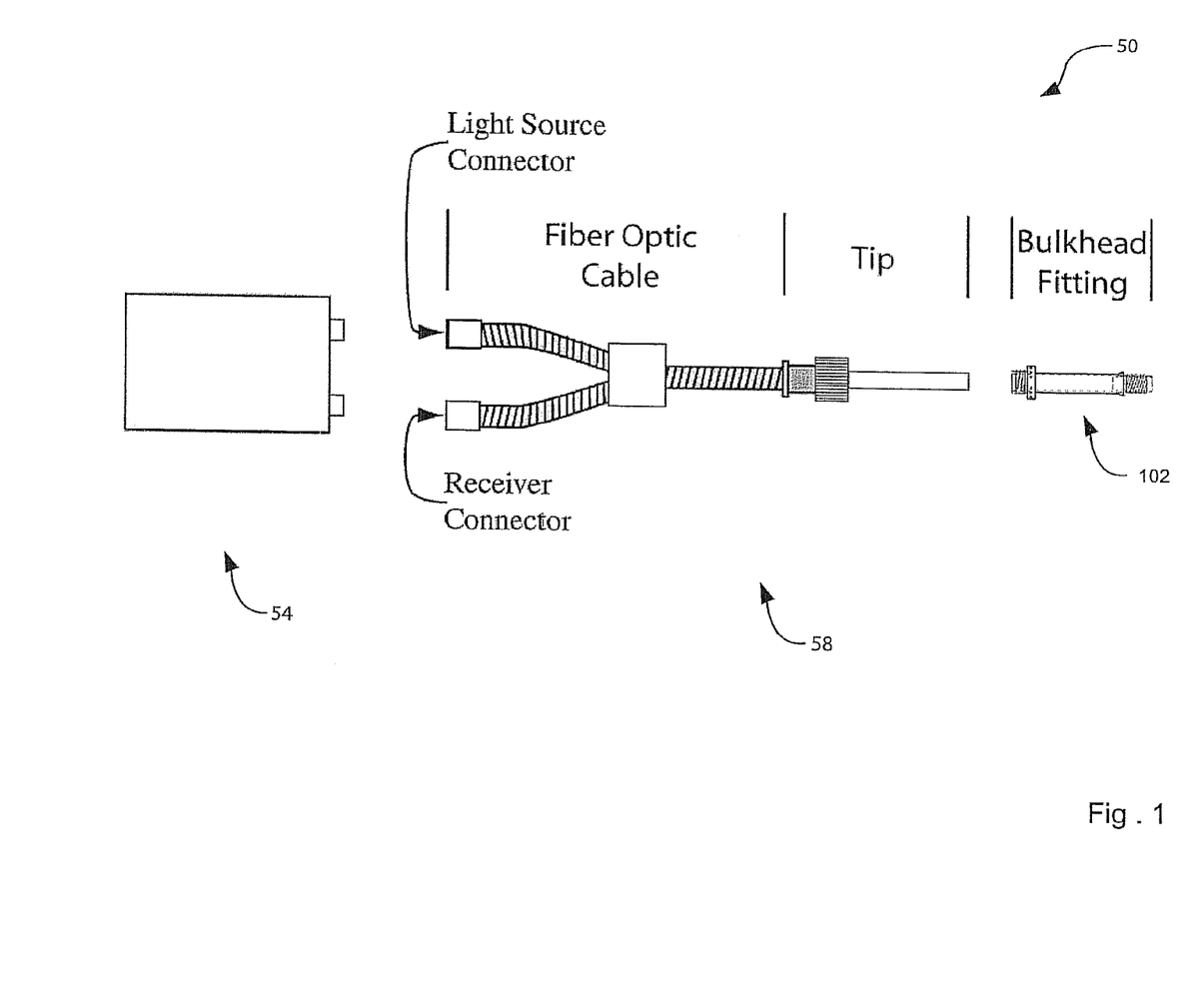
FIG. 1 shows a schematic representation of a system for monitoring for a moving surface.
Figure 2:
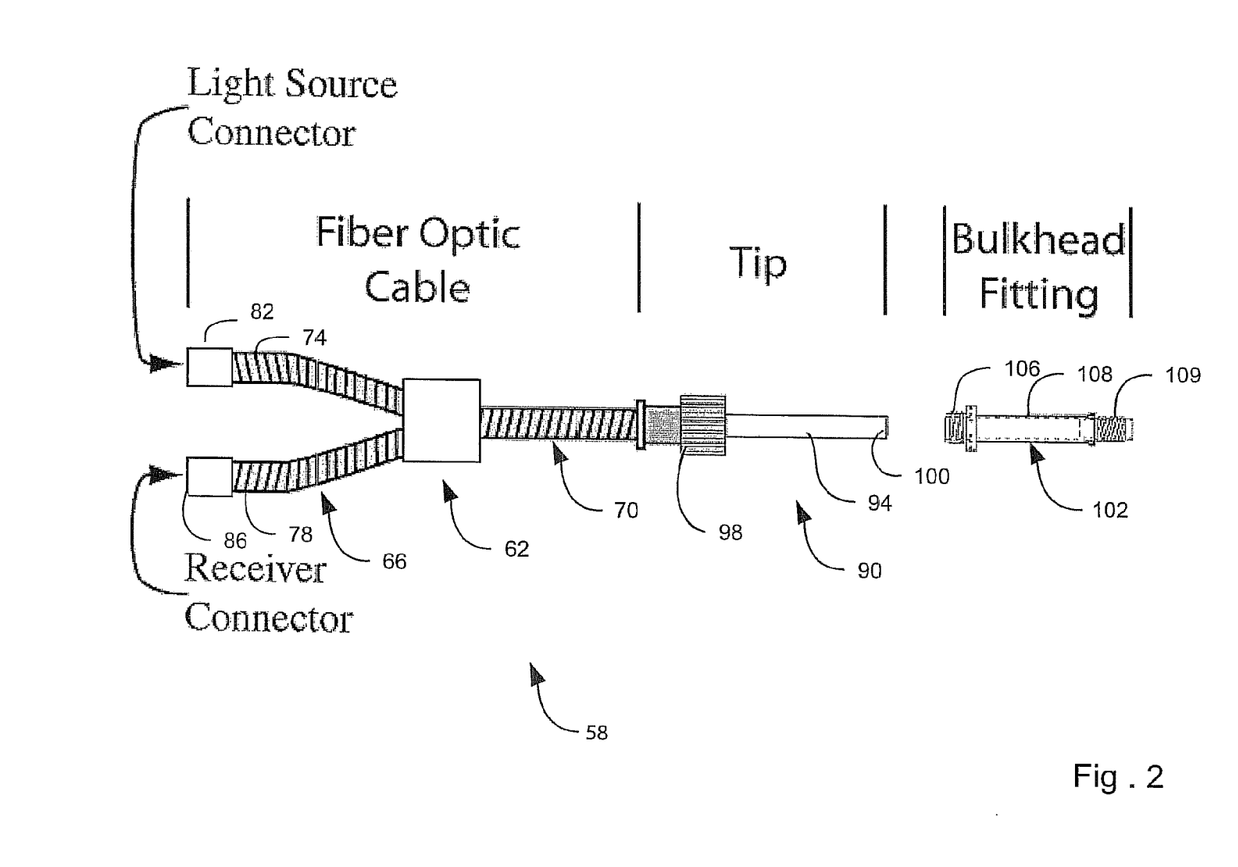
FIG. 2 shows the optical portion of the system of FIG. 1.
Figure 5:
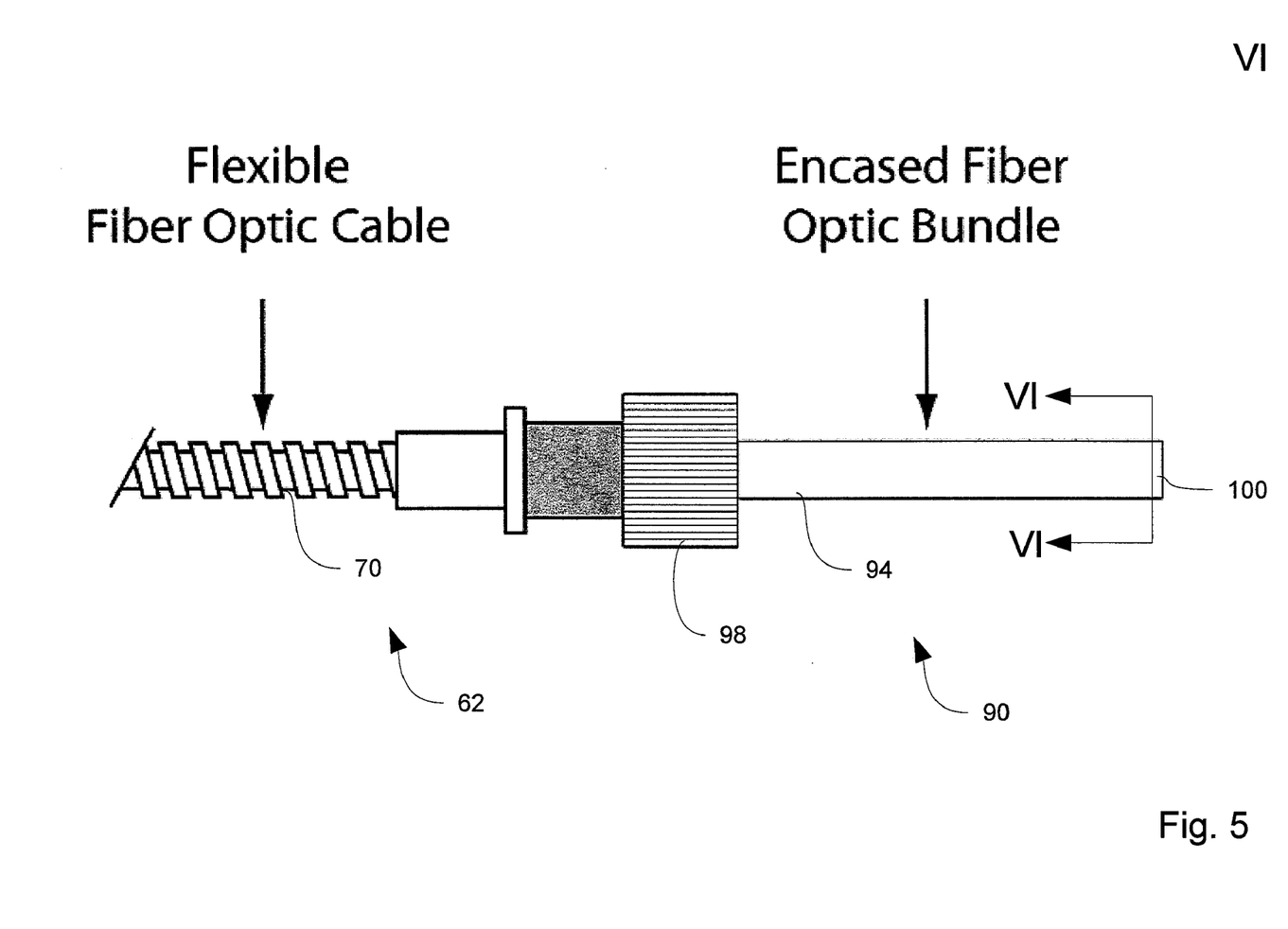
FIG. 5 shows a partial view of the end of the optical portion of FIG. 2.

Optical portion 58, which is shown in greater detail in FIG. 2, comprises a Y-shaped fiber optic cable 62. Cable 62 includes a V-section 66 and a collective section 70. V-section 66 includes a source line 74 and a receiver line 78 which merge into collective section 70. Source line 74 terminates with a source connector 82 while receiver line 78 terminates with a receiver connector 86. Collective section 70 terminates with a tip portion 90. Tip portion 90 (shown in both FIG. 2 and in FIG. 5) comprises a fiber-optic bundle 94 and a connector 98 disposed between bundle 94 and collective section 70. Fiber-optic bundle 94 contains a plurality of fiber-optic strands. A portion of the fiber-optic strands within bundle 94 are emitting as they are connected to source-line 74, and those emitting strands will thus emit light from an extreme tip 100 of bundle 94. As will be discussed further below, the remaining portion of the fiber-optic strands within bundle 94 are non-emitting as they are connected to receiver-line 78, and those non-emitting strands will thus receive light that is incident upon extreme tip 100. In general, cable 70 uses multiple fibers, in the order of hundreds, to achieve flexibility allowing a small bend radius for cable 70 and in order to carry a concentrated light source.

Referring to FIG. 2, tip portion 90 is configured to be received into, and removably secured to, a bulkhead fitting 102 and an associated light focusing mechanism. Bulkhead fitting 102 is configured to be affixed to or integrated with a bulkhead, chassis, frame or the like that is fixed in relation to the rotating surface to be measured using system 50, such that the extreme tip 100 of tip portion 90 is proximal to the rotating service.

A presently contemplated rotating surface is a gas turbine engine, but other moving surfaces are also contemplated. Indeed, the term "moving surfaces" is intended to be non-limiting to encompass, for example, rotating, reciprocating/oscillating, and linear movement. Indeed, other movement could include any patterns that repeat, whether truly periodic or not, can be monitored. For example, shafts or surfaces driven randomly by a stepper motor in robotics or automation can be monitored.

It should now be understood that bulkhead fitting 102 is optional and/or can be substituted for other types of mounts that are appropriate to the particular moving surface. However, in the present embodiment which includes bulkhead fitting 102, bulkhead fitting 102 thus also includes a tube 108 complementary to fiber-optic bundle 94 in order to receive bundle 94 therein and a connector 106 complementary to connector 98 to permit removable attachment of tip portion 90 to bulkhead fitting 102. Bulkhead fitting 102 also includes a set of exterior threads 109 on its distal tip. Threads 109 are for attaching a lens or other light focusing mechanism (not shown), and to allow adjustment thereof to focus emitted light onto the rotating surface.

Figure 3:
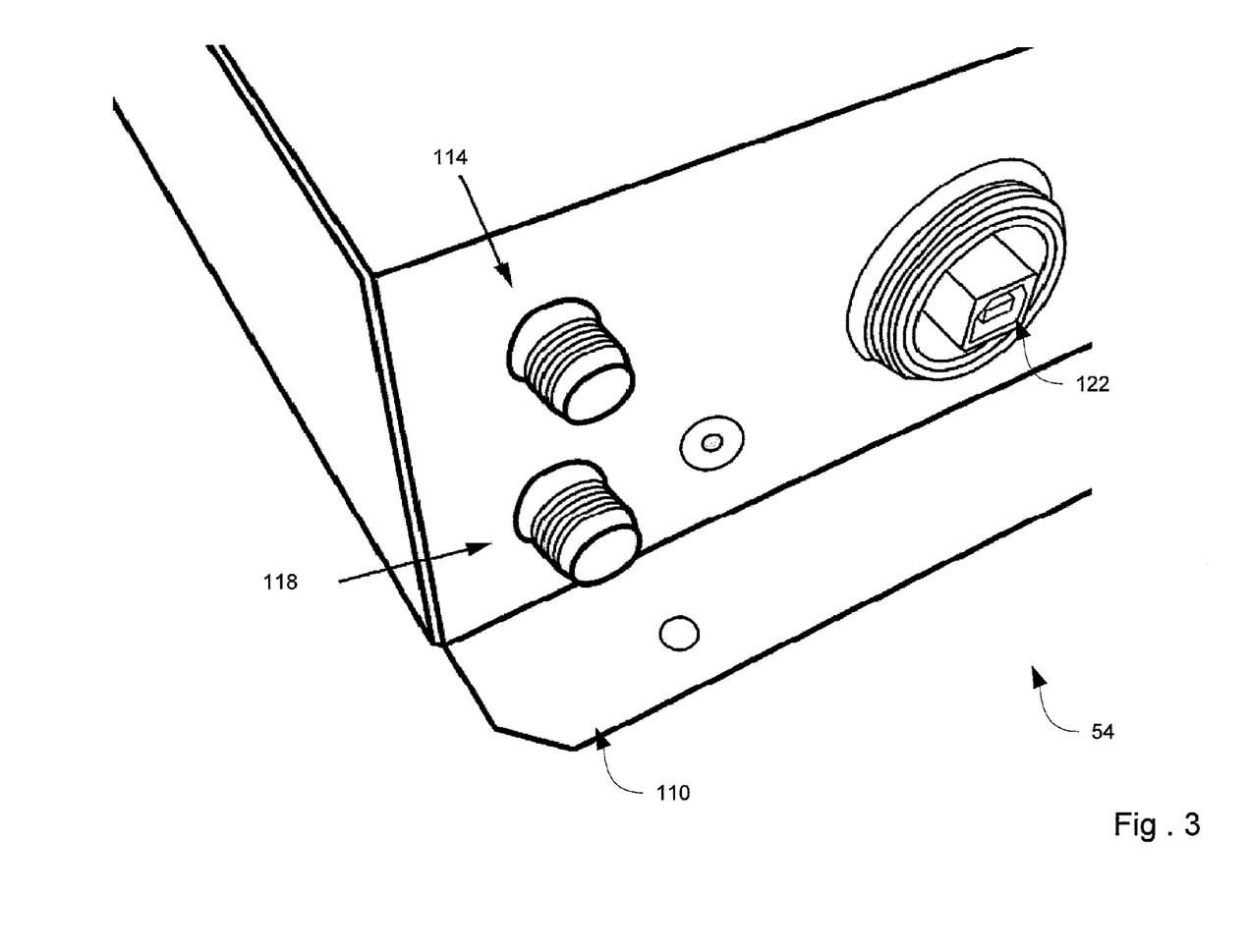
FIG. 3 shows a partial perspective view of the electronics portion of the system of FIG. 1.
Figure 4:
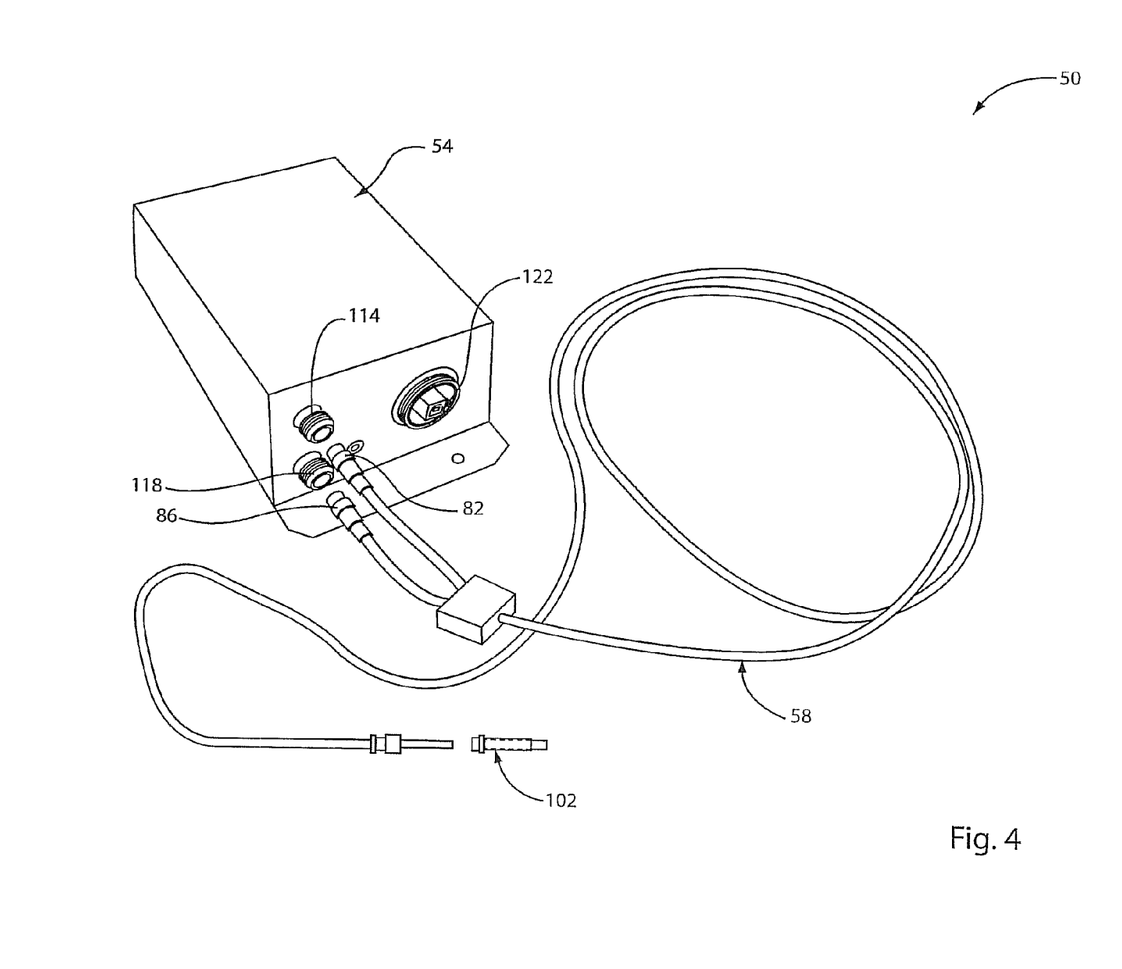
FIG. 4 shows a perspective view of the system of FIG. 1.

Electronics portion 54, which is shown in greater detail in FIG. 3, comprises a chassis 110 that encases electronics and supports a light source port 114 and a receiver port 118. Light source port 114 includes a fitting that is complementary source connector 82 so that source-line 74 can be removably attached to light source port 114. Likewise, receiver port 118 includes a fitting that is complementary to receiver connector 86 so that receiver-line 78 can be removably attached to receiver port 118. Chassis 110 also supports a data port 122, which in the present embodiment is a universal serial bus (USB) port, but in other embodiments can be based on any type of wired or wireless standard, including Ethernet, RS-485, Institute of Electronic and Electrical Engineers (IEEE) standard 802.11, Bluetooth. Data port 122 permits connection of electronics portion 54 to an external computing device either directly or through a network, so that programming changes can be made to electronics portion 54 and/or data collected on electronics portion 54 can be downloaded therefrom.

In an embodiment, the electronics within electronics portion 54 thus comprises any standard microcomputer configuration including one or more central processing units, volatile memory (e.g. random access memory), non-volatile memory (e.g. read only memory, FLASH memory), all interconnected by a bus to which ports 114, 118 and 122 will also connect. The microcomputer configuration renders electronics portion 54 functional to operate as a tachometer (or other monitoring system) in accordance with the teachings further described below. Those skilled in the art will now recognize that the electronics in electronics portion 54 can also be implemented using other hardware configurations, such as using field-programmable-gate arrays or the like.

In operation, optical portion 58 is connected to electronics portion 54 by attaching source connector 82 to source port 114 and receiver connector 86 to receiver port 118. Bulkhead fitting 102 is disposed within the bore of a chassis of a gas turbine engine or other moving surface. Tip portion 90 is disposed within bulkhead fitting 102 and attached thereto by joining connector 98 to connector 106, such that extreme tip 100 is proximal to the rotating surface. Power is then applied to electronics portion 54 and then light is driven through source line 74 and then emitted from extreme tip 100 and onto the rotating surface. The features of the rotating surface then reflect the emitted light back towards tip 100 into the non-emitting fiber-optic strands within tip 100, and that light is then carried back through receiver line 78 and back into electronics portion 54.

Those skilled in the art will now appreciate that the reflective features of the rotating surface will vary over the circumference of the surface. Accordingly, non-emitting fiber-optic strands within tip 100 will receive a time varying pattern of reflected light from the surface of the rotating surface that will substantially correspond to the reflective features of the rotating surface. Accordingly, time-varying periodic patterns of light will be collected through receiver line 78 and back into electronics portion 54.

Figure 6:
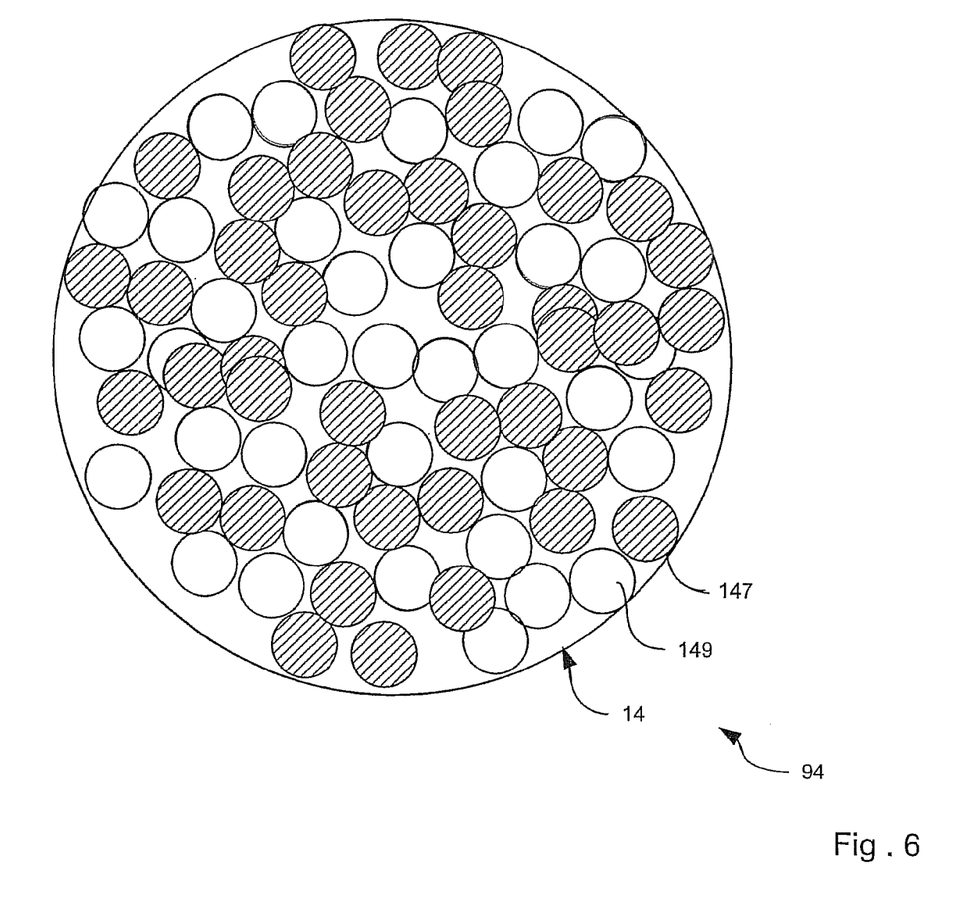
FIG. 6 shows a representation of an exemplary distribution of emitting and non-emitting of fiber optic strands in a cross section of the optical portion of FIG. 2 through the lines VI-VI in FIG. 5.

FIG. 6 shows a representation of an exemplary distribution of emitting and non-emitting of fiber optic strands in a cross section 145 of bundle 94. Cross section 145 includes a plurality of emitting 147 and non-emitting fiber optic strands 149. Emitting strands 145 are represented by a solid circle, while non-emitting strands 149 are represented by an empty circle. Cross section 145 includes in the order of hundreds of strands 147, 149. In a present embodiment include about one-thousand strands 147, 149. (For convenience and ease of explanation, only a representative few strands 147, 149 are actually shown in FIG. 6.) Approximately half of the strands in cross section 145 are emitting strands 147 that combine in source line 74, while the remaining strands in cross section 145 are non-emitting strands 149 that combine in receiver line 78. In a present embodiment, strands 147, 149 are dispersed in a substantially random pattern throughout cross section 145. In a present embodiment, strands 147, 149 are also dispersed in a substantially evenly in relation to each other throughout cross section 145. Such approximately sized distribution pattern of light can substantially fully illuminate the surface to be sensed. The individual strands 147, 149 can cooperate to create a visual "average" of the surface reflection for detection by the electronics portion 54. It is to be understood, however, that such a visual "average" of reflection is not required and other measurement paradigms are contemplated as desired for a particular situation.

Figure 7:
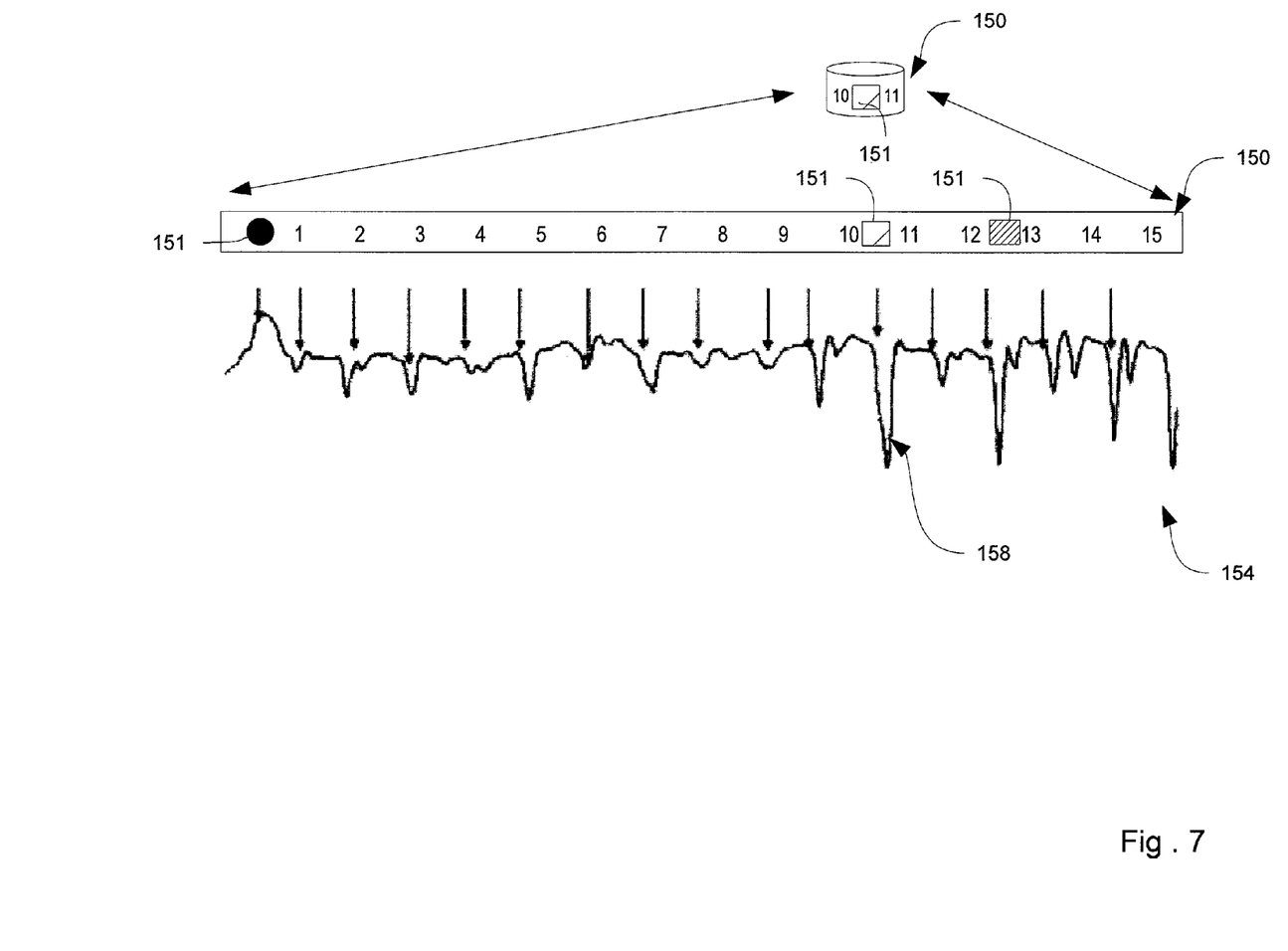
FIG. 7 shows the surface of a spinning wheel embossed with metal stamped numerals in the upper half of FIG. 7, and an associated waveform.

To provide a simplified example of a signal gathered from an exemplary rotating surface, FIG. 7 represents the surface of a wheel 150 embossed with metal stamped numerals between the numbers one and fifteen. Wheel 150 is represented twice in FIG. 7—once as a cylinder, and again as bar. The bar representation of wheel 150 represents a linear projection of the circumference of wheel 150. The stamped numerals are distinct artifacts that are present on wheel 150 such that when wheel 150 is rotating, system 50 will detect those artifacts, as will be discussed in greater detail below. Wheel 150 also is shown with two physical artifacts 151, which represent any kind of scuffing, abrasion, imperfections or any other type of marking that could appear on wheel 150.

Of note, while such markings can be specially applied for purposes of utilizing system 50, such markings need not be specially applied.

FIG. 7 also shows a waveform 154 that corresponds to the detected reflective features of wheel 150. Waveform 154 can be generated using system 50. The reflected light from wheel 150 is represented on waveform 154 as arrows 158 indicating a relationship of 'light' and 'dark' characteristics of the stamped numerals and artifacts 151 (and other marking that are not expressly drawn but which are implied in waveform 154 for purposes of providing an example) on the surface of the spinning wheel 150. A shorter arrow indicates a dark characteristic, while a longer arrow indicates a light characteristic.

Figure 8:
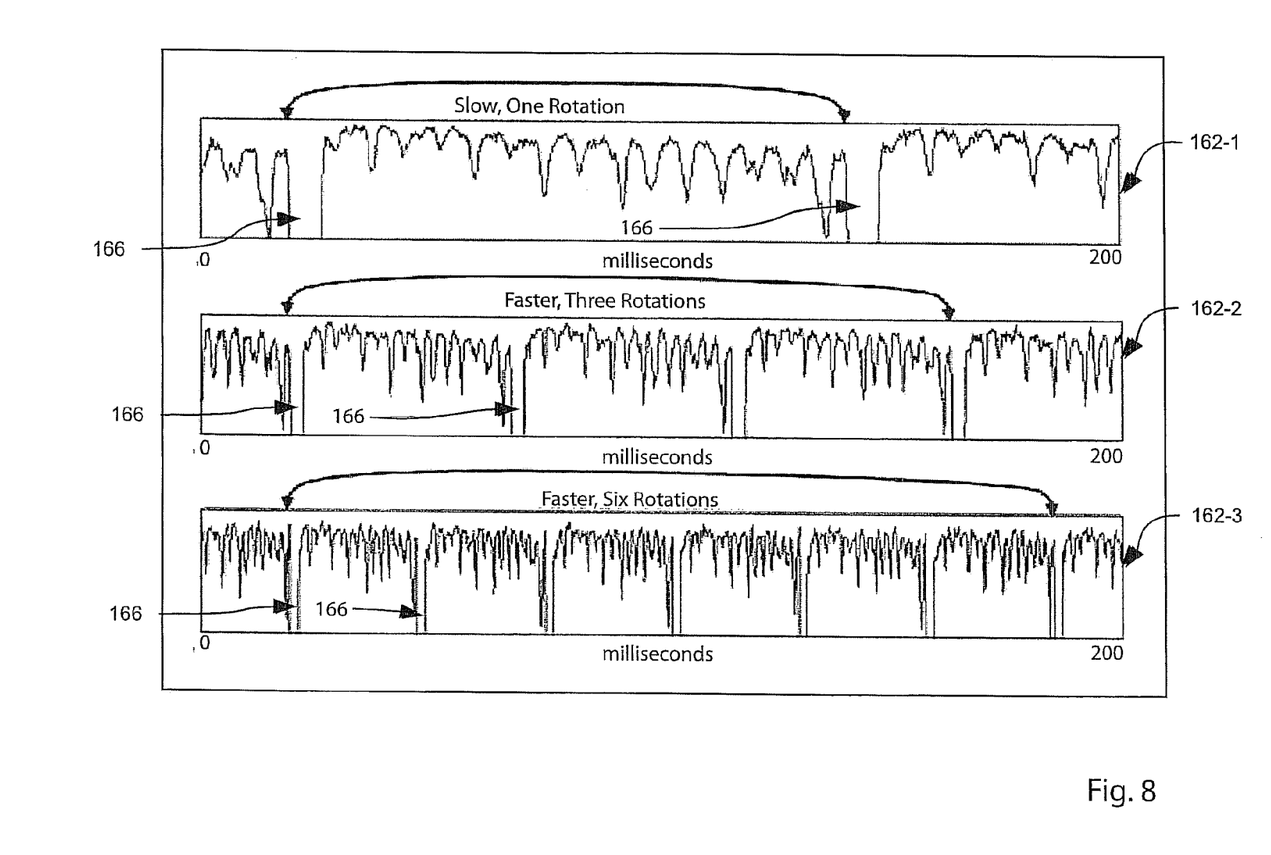
FIG. 8 shows an example of three separate waveforms as detected by the system of FIG. 1.

To provide a more complex example of a signal gathered from an exemplary rotating surface, FIG. 8 shows three separate waveforms 162-1, 162-2, 162-3 (Collectively, waveforms 162, and generically waveform 162. This nomenclature is used elsewhere herein.) as detected by system 50. These waveforms represent three different speeds of a gas turbine engine. Waveform 162-1 represents a slow rotation, with only one complete rotation being shown in entire waveform 162-1. Waveform 162-2 represents a faster rotation (in relation to waveform 162-1), with three complete rotations being shown in entire waveform 162-2. Waveform 162-3 represents a faster rotation (in relation to waveform 162-2), with six complete rotations being shown in entire waveform 162-3. The extreme negative-going excursion (or trough) 164 in each waveform 162 separate and distinct from the turbine blade reflections represents a unique mark that is present on shaft of the gas turbine, and can be used as the once-per-revolution marker. Of note is that the unique mark can be based on some inherent feature or artifact already present on the shaft of the gas turbine—and it need not be a specially-applied paint or other marker.

Figure 9:
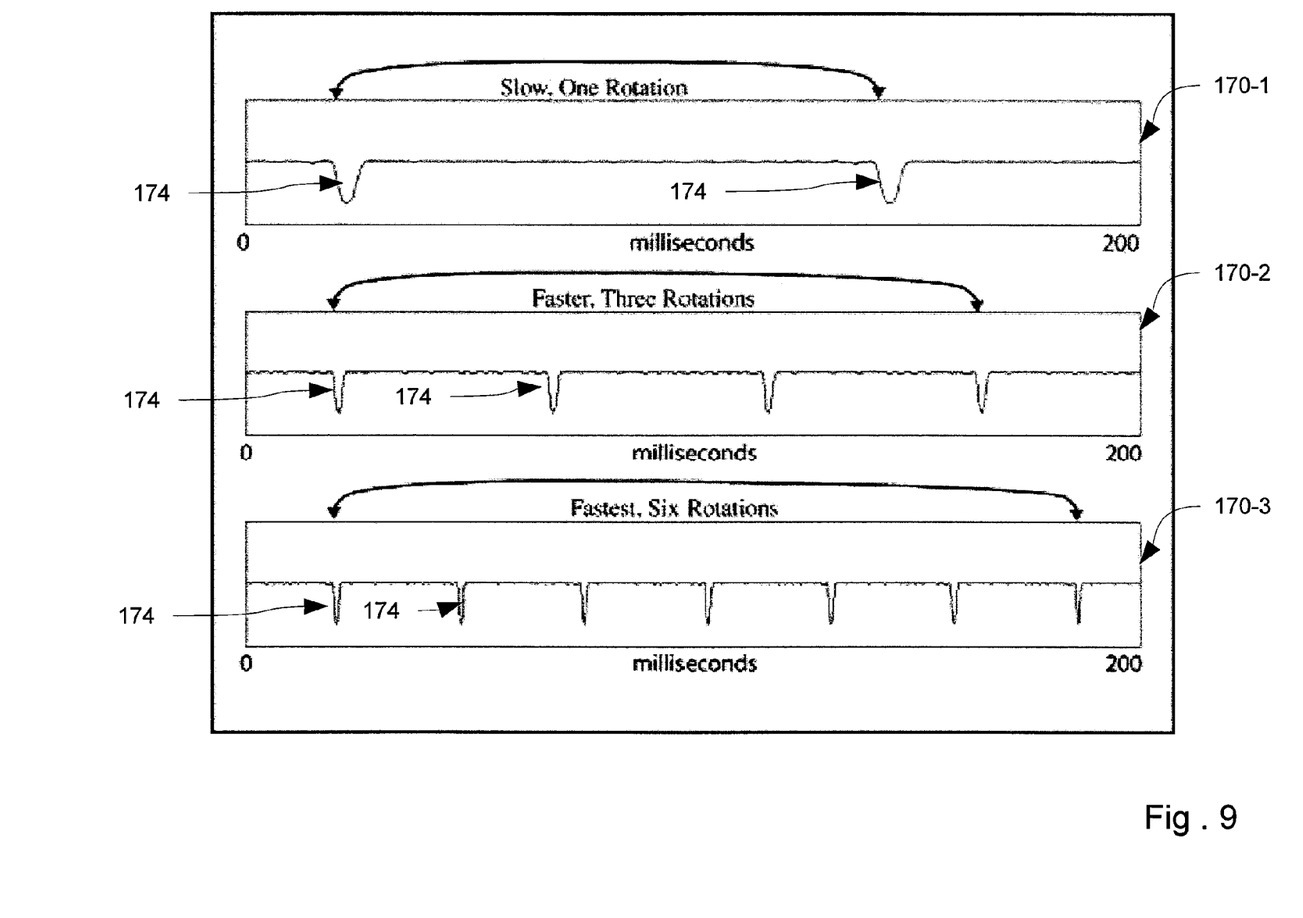
FIG. 9 shows the waveforms of three separate speeds of the wheel of FIG. 7.

FIG. 9 shows waveforms 170 which respectively correspond to waveforms 162 of FIG. 8. The three separate speeds shown in FIG. 8 are processed by electronic portion 54 creating pulses 174 that are the absolute positional dependent "once-per-revolution" signals created by the extreme negative going excursions 166 discussed in relation to FIG. 8. It should be understood that waveforms 170 and 162 are merely exemplary—individual revolutions can be associated with smoother and/or gentler changes in waveforms as well, and/or any other unique artifact associated with any given waveform shape.

Having provided an overview of system 50, further discussion of various aspects and features of system 50 is provided below. As previously described, optical portion 58 is connected to electronics portion 54 by attaching source connector 82 to source port 114 and receiver connector 86 to receiver port 118. Bulkhead fitting 102 is disposed within the bore of a chassis of a gas turbine engine or other rotating surface. Tip portion 90 is disposed within bulkhead fitting 102 and attached thereto by joining connector 98 to connector 106, such that extreme tip 100 is proximal to the rotating surface. Power is then applied to electronics portion 54 and light is driven through source line 74 and then emitted from extreme tip 100 and onto the rotating surface. An optical focusing tip or other light focusing mechanism can be permanently applied to bulkhead fitting 102 within the chassis of the gas turbine engine.

System 50 is configured to transmit light onto the rotating surface via a light source as connected to a bulkhead fitting via a light focusing mechanism. The now-illuminated rotating surface then presents its reflection to a light sensitive device again via the light focusing mechanism. The light focusing mechanism is configurable to focus the reflected light from the rotating surface onto the receiving (i.e. non-emitting) ends of bundle 90.

Additionally, electronics portion 54 can receive the reflected light (via cable 62) and be configured to provide a single averaged value of the averaged values already being received due to the dispersion of the emitting and non-emitting fiber optics within extreme tip 100. This average of the average is used to quantify of the surface reflection. Electronics portion 54 is configured to convert the presented reflected light to an electronic signal that can be measured and recorded by a sampling mechanism also incorporated into electronics portion. The sampling mechanism within electronics portion 54 measures and records this electronic signal in accordance with timing instructions provided by its connection to the recognition process and timing mechanism. These measured and recorded points are called "sample points". Over time, these sample points represent an electronic signature of the reflected image as viewed by the light focusing mechanism. The surface recognition feature records a high-speed electronic "fingerprint" of the rotating shaft surface. In an embodiment, up to 70,000 data points/second can be processed, which is suitable for a gas turbine engine. In other embodiments, hundreds-of-thousands of data points/second can be processed. In general, the number of data points/second that are processed can be chosen to correspond with the speed of the surface being monitored. The timing mechanism performs a series of comparisons of the electronic signal to determine a repeating pattern. When there is a sufficient correlation between previously recorded sample points and current sample points, this event is marked. When the recognition process finds a repeating event, it outputs a signal in coordination with the timing mechanism that marks the event marker position in time via the optional event marker. These signals are called "coded signals". A signature representing one cycle of the surface with a known or derived position and/or velocity is used for comparison to subsequent data. As new data streams from the sampling mechanism to the processing device, the new data is compared to the signature; when the correlation is sufficient it is then determined to represent the appearance of a new cycle and an event marker may be issued. Signatures longer than one cycle can be created representing long-term trends; reflectivity, angle, etc. Other shorter signatures can be created representing short-term events such as peak power, transient events, scale, etc.—both for improvement of the cyclic recognition and general maintenance and monitoring. The foregoing and the other related functionalities of electronics portion 54, can all be implemented as software and/or hardware and/or firmware and/or combinations thereof within electronics portion 54.

Figure 10:
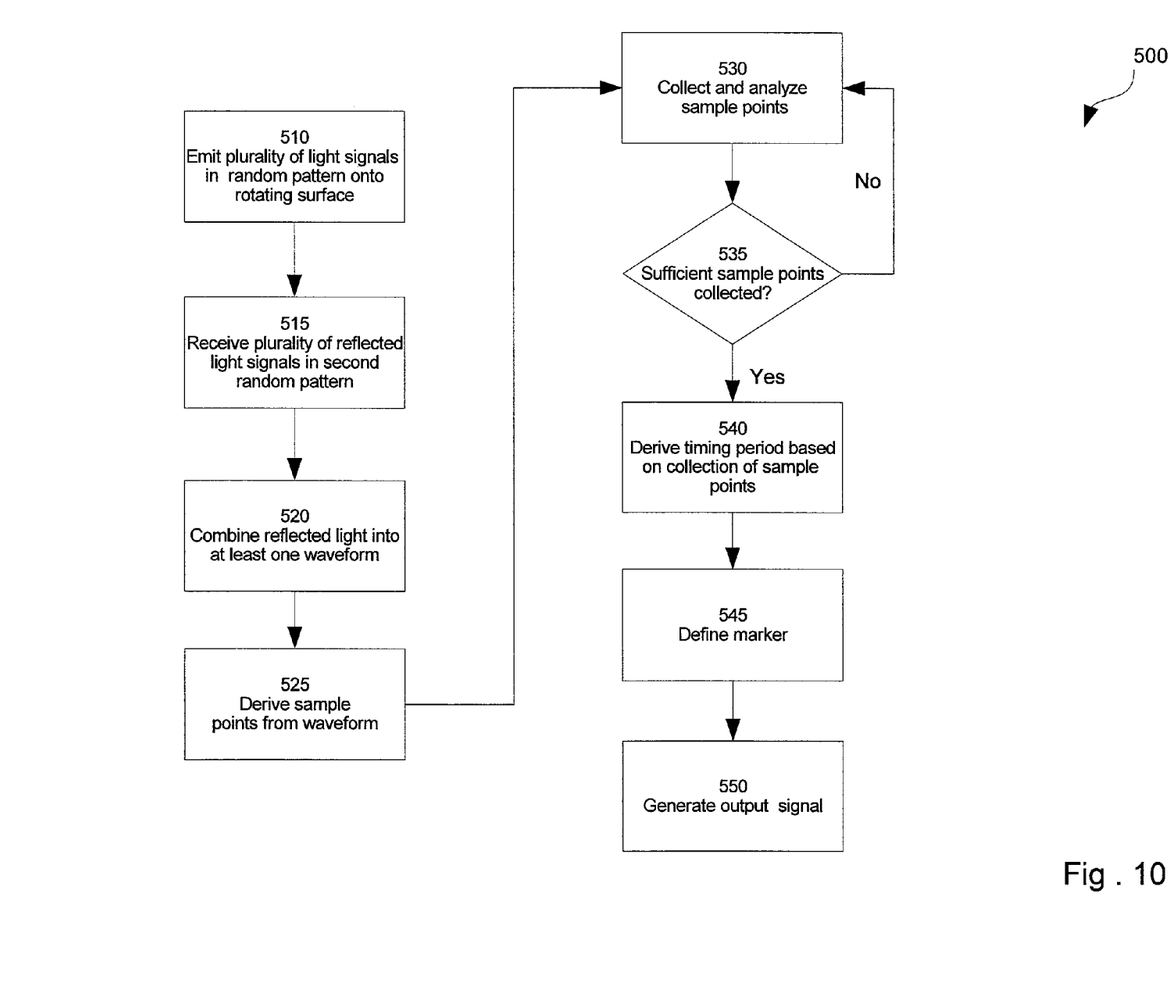
FIG. 10 shows a flow-chart depicting a method for monitoring a moving surface.

Referring now to FIG. 10, a method for monitoring a rotating surface is depicted in the form of a flow-chart and indicated generally at 500. Method 500 can be implemented as software and/or hardware and/or firmware and/or combinations thereof within electronics portion 54. Method 500 further illustrates various features and aspects of system 50, although method 500 (and variants thereof) can be used with variants of system 50. Beginning at step 510, a plurality of light signals are emitted in a random pattern onto a rotating (or other moving) surface. When performed using system 50, electronics portion 54 will emit light through a plurality of emitting fiber optic strands 147 from light source port 114 and through cable 62 and out through distal tip 100. Next, at step 515, reflections from the rotating surface are collected at non-emitting fiber optic strands 149 at distal tip 100, which are in turn carried back through cable 62 to electronics portion 54 via receiver port 118.

Next, at step 520, the light received at step 515 is combined into a at least one waveform. The waveform can have the appearance of any of waveforms 162 in FIG. 7.

Next, at step 525 sample points are derived from the waveform that is generated at step 520. These sample points can be any or all of the troughs found in, for example, waveforms 162 of FIG. 7. Step 525 merely identifies these points.

Next, at step 530 a plurality of the sample points that are derived at step 525 are collected and analyzed. The analysis is configured to ascertain a repeating pattern within waveform 162. Thus, at step 535, a determination is made as to whether sufficient sample points have been collected to ascertain a repeating pattern. If "no", method 500 cycles from step 535 back to step 530. If "yes", method 500 advances from step 535 to step 540.

At step 540, a timing period is derived based on the collected sample points, and a marker is defined therefrom at step 545. At step 550 an output signal is generated based on the marker defined at step 545 and the timing period derived at step 540. An example of an output signal that corresponds to signal 162-1 would include output signal 170-1 of FIG. 9. (Likewise, output signal 170-2 would correspond with signal 162-2 and output signal 170-3 would correspond without signal 162-3).

As one variation to method 500, upon completion of step 550, method 500 can return back to step 535. Indeed, it is to be understood that method 500 is shown as a series of steps for ease of presentation and explanation, but that when implemented by persons skilled in the art, the steps of method 500 are deployed in an iterative, self-correcting manner so that as more sample points are derived at step 525, an improved timing period can be derived at step 540 and more precise marker can be derived at step 545 so that a more meaningful output signal can be generated at step 550. Indeed, such iterations can eventually reveal any variations or fluctuations in the surface that occur over a number of rotations or other period of time.

Figure 11:
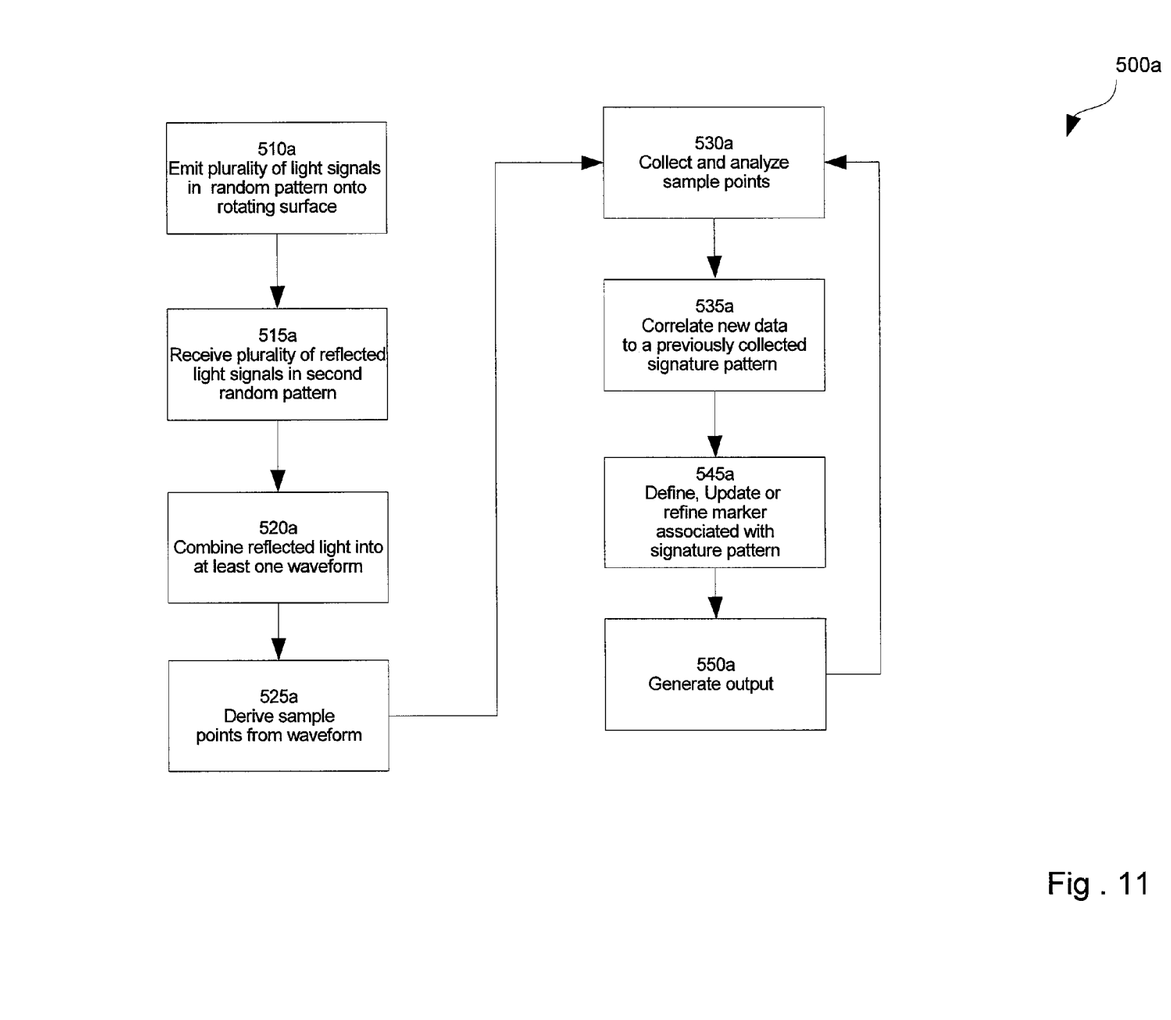
FIG. 11 shows a flow-chart depicting another method for monitoring a moving surface.

FIG. 11 shows another variation of method 500, shown as method 500a. Steps 510a through 530a are substantially the same as step 500 through 530. At step 535a, new data is correlated to a previously-collected signature pattern. The previously-collected signature pattern can be a signature pattern associated with the rotating surface associated with step 510a, and the previously-collected signature pattern can be obtained by performing steps substantially equivalent to steps 510a-530a on a separate process prior to the actual performance of method 500a. At step 545a the marker associated with the previously-collected signature pattern is defined and/ or updated and/or refined as the case may require. At step 555a output is generated. After step 555a the method returns to step 530a. The output that is generated at step 555a can be a waveform or in any other suitable format. Note that it can be desired to perform steps 530a-545a according to a desired criteria (e.g. a number of cycles so that the results of those cycles can be averaged) prior to actually performing step 550a.

The functionality of method 500, and the other related functionalities of electronics portion 54, can all be implemented as software and/or hardware and/or firmware and/or combinations thereof within electronics portion 54.

While the foregoing presents certain specific embodiments, variations, combinations and/or subsets of those embodiments are contemplated. For example, system 50 can be altered to employ a camera in place of tip portion 90. As another example, embodiments herein refer to a bundle 94 of fibre optic strands in cable 62. However, in other embodiments, cable 62 can be implemented with a single fiber as an emitter and another an a collector. In a single-fiber solution it can be desired to use a brighter source, such as a laser or a pulsed light emitting diode ("LED") to compensate for reduced reflection. Alternatively, fibre can be omitted altogether and other types of emitters or collectors can be used. In addition, cable 62 can be eliminated altogether by a configuration that implements the emitting and receiving function of electronics portion 54 within a device that is resident all within the same form-factor as tip 94 in and of itself. As a still further example variation, hybrids of the above are contemplated whereby a source is housed completely within tip 94, but a receiver line (such as line 78) is connected to a modified version of electronics portion 54 that does not include a source or a source port 114. In these variations, it can be desired to provide additional cooling capabilities, particularly where the entire system is incorporated into tip 94 and located proximal to the moving surface. As a still further variation, a lasing device can be used in place of an emitting lamp within electronics portion 54. Those skilled in the art will now recognize that method 500 and method 500a and variations of each can be implemented on other systems, other than system 50.

There are various novel features of the present specification. For example, the use of the tip portion 90 and the signal processing electronics within electronics portion 54. The tip portion 90 allows system 50 to be used in many different applications. The electronics of electronics portion 58 also process an electronic representation of the observed surface reflection inherent to the surface of the rotating object to obtain the desired output.

The electronic portion 58 is configured to amplify and filter the waveform obtained at receiver port 118 into yet another waveform that also represents the passing rotating surface. In Mode 1 operation the repeating pattern can have a distinguishing unique "marker" that deviates from the normal signal level. This unique mark can be directly related to a known physical location on the rotating surface and thereby becomes a known reference point that the surface recognition technology can utilize without operator intervention. In Mode 2 the pattern repeats by there is no unique distinguishing marker evident in the waveform. In this Mode an operator will observe the waveform and either create a physical reference point or assign a physical reference point that electronics portion 58 will then retain.

In both Mode 1 and Mode 2 the Electronic Portion produces a Transistor-Transistor Logic ("TTL") level output pulse in accordance with the processed data that has produced a reference point as seen in FIG. 9 as derived from the waveforms 162 shown in FIG. 8. It should also be understood that other types of output signals are contemplated, other than the type of signal shown in FIG. 9.

While system 50 addresses the positioning problem associated with gas turbine engines, this technology also applies to other less restrictive applications. Such uses include: commercial power systems; the aircraft industry; industrial infrastructure machinery such as pumps, compressors and motors; gas turbine power system engines, which includes stationary engines such as commercial and military power systems, co-generation plants, and emergency standby generators; gas and steam turbine powered marine propulsion systems; and mobile turbines. These are other possible applications and are not intended to be an exhaustive list of all potential applications.

The invention claimed is:

1. A monitoring system for a moving surface comprising:
    an emitter for emitting at least one light signal onto said moving surface;

a collector for receiving at least one reflected representation of said at least one light signal; and electronics connected to said collector and configured to combine said at least one reflected representation into at least one waveform; said electronics further configured to derive and collect a plurality of sample points from said at least one waveform; said electronics further configured to derive a timing period from said collection of sample points when a sufficient number of said sample points have been collected; said electronics further configured to define a marker in said at least one waveform and generate an output signal that includes a representation of at least said marker, wherein said electronics comprise a microcomputer configuration including one or more central processing units, volatile memory, non-volatile memory, all interconnected by a bus to which a source respective to said emitter and said collector also connect.

2. The monitoring system of claim 1 wherein said emitter comprises a plurality of light emitting fiber-optic strands randomly dispersed in parallel to each other.

3. The monitoring system of claim 2 wherein said collector comprises a plurality of non-light emitting fiber-optic strands randomly dispersed in parallel to each other and in relation to said light emitting fiber-optic strands.

4. The monitoring system of claim 1 wherein said moving surface is a gas turbine engine and said emitter and said collector are mounted within a bulkhead fitting attached within a bore of a chassis of said gas turbine engine.

5. The monitoring system of claim 1 wherein said emitter and said collector are connected to said electronics via a fiber optic cable.

6. The monitoring system of claim 1 wherein said electronics further comprise an interface for connecting an external device to receive said generated output signal.

7. The monitoring system of claim 1 wherein said surface is rotating.

8. The monitoring system of claim 1 wherein said electronics comprise a plurality of field programmable gate arrays.

9. A method for monitoring a moving surface comprising:
emitting at least one light signal onto said moving surface, wherein said emitting step is performed using a plurality of light emitting fiber-optic strands randomly dispersed in parallel to each other;
receiving at least one reflected representation of said at least one light signal;
combining said at least one reflected representation into at least one waveform;
deriving a plurality of sample points from said at least one waveform;
deriving a timing period from said plurality of sample points when a sufficient number of said sample points have been derived;
defining a marker in said at least one waveform; and
generating an output signal that includes a representation of at least said marker.

10. The method of claim 9 wherein said receiving step is performed using a plurality of non-light emitting fiber-optic strands randomly dispersed in parallel to each other and in relation to said light emitting fiber-optic strands.

11. The method of claim 9 further comprising sending said output signal to an external device.

12. The method of claim 9 wherein said surface is rotating.

13. The method of claim 9 wherein said at least one waveform is a single waveform.

14. A method for monitoring a moving surface comprising:
emitting at least one light signal onto said moving surface, wherein said moving surface is a gas turbine engine and an emitter and a collector are mounted within a bulkhead fitting attached within a bore of a chassis of said gas turbine engine;
receiving at least one reflected representation of said at least one light signal;
combining said at least one reflected representation into at least one waveform;
deriving a plurality of sample points from said at least one waveform;
deriving a timing period from said plurality of sample points when a sufficient number of said sample points have been derived;
defining a marker in said at least one waveform; and
generating an output signal that includes a representation of at least said marker.

15. The method of claim 14 further comprising sending said output signal to an external device.

16. The method of claim 14 wherein said surface is rotating.

17. The method of claim 14 wherein said at least one waveform is a single waveform.

* * * * *